United States Patent
Mettan

(10) Patent No.: US 11,050,090 B2
(45) Date of Patent: Jun. 29, 2021

(54) LIQUID ELECTROLYTE FORMULATION FOR LITHIUM METAL SECONDARY BATTERY AND LITHIUM METAL SECONDARY BATTERY COMPRISING SAID LIQUID ELECTROLYTE FORMULATION

(71) Applicant: Belenos Clean Power Holding AG, Biel/Bienne (CH)

(72) Inventor: Yoann Mettan, Evionnaz (CH)

(73) Assignee: Belenos Clean Power Holding AG, Biel/Bienne (CH)

( * ) Notice: Subject to any disclaimer, the term of this patent is extended or adjusted under 35 U.S.C. 154(b) by 120 days.

(21) Appl. No.: 16/143,810

(22) Filed: Sep. 27, 2018

(65) Prior Publication Data

US 2019/0198930 A1    Jun. 27, 2019

(30) Foreign Application Priority Data

Dec. 22, 2017  (EP) ..................................... 17210329

(51) Int. Cl.
  *H01M 10/0567* (2010.01)
  *H01M 10/0569* (2010.01)
  (Continued)

(52) U.S. Cl.
  CPC ....... *H01M 10/0569* (2013.01); *H01M 4/382* (2013.01); *H01M 10/052* (2013.01);
  (Continued)

(58) Field of Classification Search
  CPC .............. H01M 4/382; H01M 10/052; H01M 10/0525; H01M 10/0567; H01M 10/0568;
  (Continued)

(56) References Cited

U.S. PATENT DOCUMENTS 10,530,011 B1 *  1/2020  MacKenzie ....... H01M 10/0565
2010/0178555 A1  7/2010  Best
(Continued)

FOREIGN PATENT DOCUMENTS

EP       2 549 577 A1    1/2013
JP       2004-292350    10/2004
(Continued)

OTHER PUBLICATIONS

European Search Report dated May 9, 2018 in European Application 17210329.3, filed on Dec. 22, 2017.

*Primary Examiner* — Brittany L Raymond
(74) *Attorney, Agent, or Firm* — Oblon, McClelland, Maier & Neustadt, L.L.P.

(57) ABSTRACT

The present invention relates to a liquid electrolyte formulation for a lithium metal secondary battery comprising:
  a conductive lithium salt which is selected from the group consisting of LiTFSI, LiFSI, LiCl, LiF, LiCN, $LiC_2N_3$, $LiN_3$, $LiNO_2$, $LiNO_3$, $LiBF_4$, $LiPF_6$, $LiAsF_6$, $LiSbF_6$, and $LiAlCl_4$
  a first ionic liquid having the formula (CATION)FSI, wherein CATION is selected from the group consisting of alkyl pyrollidinium and alkyl piperidinium,
  a second ionic liquid as anti-corrosion agent, said second ionic liquid having the formula (CATION)(ANION) where (CATION) is defined as above and (ANION) is an anion comprising at least one nitrile functionality. The present invention relates also to a process for preparing such liquid electrolyte formulation and a lithium metal secondary battery comprising said liquid electrolyte formulation.

12 Claims, 9 Drawing Sheets

(51) Int. Cl.
*H01M 10/0525* (2010.01)
*H01M 4/38* (2006.01)
*H01M 10/052* (2010.01)

(52) U.S. Cl.
CPC ... *H01M 10/0525* (2013.01); *H01M 10/0567* (2013.01); *H01M 2300/0028* (2013.01); *H01M 2300/0045* (2013.01)

(58) Field of Classification Search
CPC ..... H01M 10/0569; H01M 2300/0028; H01M 2300/0045
See application file for complete search history.

(56) References Cited

U.S. PATENT DOCUMENTS

| | | | |
|---|---|---|---|
| 2013/0017456 A1* | 1/2013 | Sugimoto | H01M 10/0569 429/339 |
| 2014/0125292 A1 | 5/2014 | Best et al. | |
| 2014/0342249 A1* | 11/2014 | He | H01M 10/056 429/403 |

FOREIGN PATENT DOCUMENTS

| | | |
|---|---|---|
| JP | 2005-32551 | 2/2005 |
| JP | 2008-257963 | 10/2008 |
| WO | WO 2009/003224 A1 | 1/2009 |
| WO | WO 2012/145796 A1 | 11/2012 |

* cited by examiner

LIQUID ELECTROLYTE FORMULATION FOR LITHIUM METAL SECONDARY BATTERY AND LITHIUM METAL SECONDARY BATTERY COMPRISING SAID LIQUID ELECTROLYTE FORMULATION

This application claims priority from European Patent Application No. 17210329.3 filed on Dec. 22, 2017; the entire disclosure of which is incorporated herein by reference.

FIELD OF THE INVENTION

The present invention relates to a liquid electrolyte formulation for lithium metal secondary battery. The present invention relates also to a process for preparing such liquid electrolyte formulation and a lithium metal secondary battery comprising said liquid electrolyte formulation.

BACKGROUND OF THE INVENTION

Conventional solvent-based electrolyte formulations are not suitable to perform reversible lithium electrodeposition. While lithium dissolution proceeds smoothly, the deposition of lithium metal on lithium is accompanied by significant electrolyte decomposition. The decomposition products form the so-called solid electrolyte interface (SEI) on lithium. The decomposition occurs every cycle and shows in the low coulombic efficiency of such systems. This phenomenon leads to electrolyte consumption and "drying out" of the cell.

In addition, the decomposition of such electrolytes is accompanied by gas evolution, which would cause cell failure in pouch cells and other pressure sensitive designs.

Moreover, the lithium deposition occurs unevenly and causes the formation of dendrites. The phenomenon is common to metal electrodes and often prevents their use in secondary cells. The dendritic lithium deposits can break, resulting in dead lithium, or grow through or around the separator resulting in cell short circuits.

The combination between high-surface dendritic deposits and flammability of the organic solvent (low flame point and high volatility) represents a serious hazard. Any cell malfunction could potentially lead to fire and explosion, as it happened with the early commercial products in the late 1980s.

Ionic liquids have been utilized as an alternative to organic solvents because of their non-volatility and non-flammability, which renders ionic liquid electrolytes inherently safer. However the lithium metal deposition is plagued by the same issues than in organic solvents.

A large number of formulation based on ionic liquids are still to reactive towards lithium metal to ensure sufficient coulombic efficiency. SEI causing high impedance grows continuously on operation and leads to cell failure.

Another disadvantage is the high viscosity of the mixtures in particular when a lithium salt is added. This results in mixtures with low conductivities or low lithium activity limiting the rate capability below what most applications require.

Although some types of ionic liquids show wide electrochemical window up to 5.5 V vs. Li+/Li or higher, the ones allowing lithium metal deposition with coulombic efficiencies over 90% are not stable at higher voltage. In particular, the anions that are stable against reduction by lithium decompose on and/or corrode the positive current collector as low as 2.5 V vs. Li$^+$/Li.

SUMMARY OF THE INVENTION

In view of the above, it is an object of the present invention to provide an electrolyte formulation based on ionic liquids that allow for a reversible lithium dissolution-deposition.

Further object of the invention is to provide an electrolyte with wide electrochemical stability window.

Further object of the invention is to provide an electrolyte that allows for lithium metal cycling efficiency over 98%.

Further object of the present invention is to provide an electrolyte with high ionic conductivity (at least 1 mS/cm 25° C.) in comparison with commercial lithium ion battery electrolytes.

Further object of the present invention is to provide an electrolyte with good wetting properties.

Further object of the present invention is to provide an electrolyte decomposing without producing gases.

These objects and further advantages are achieved by a liquid electrolyte formulation for a lithium metal secondary battery comprising:
  a conductive lithium salt which is selected from the group comprising LiCl, LiF, LiTFSI, LiFSI, LiCN, LiC$_2$N$_3$, LiN$_3$, LiNO$_2$, LiNO$_3$, LiBF$_4$, LiPF$_6$, LiAsF$_6$, LiSbF$_6$, LiAlCl$_4$
  a first ionic liquid having the formula (CATION)FSI, wherein CATION is selected from the group comprising alkyl pyrollidinium and alkyl piperidinium,
  a second ionic liquid as anti-corrosion agent, said second ionic liquid having the formula (CATION)(ANION) where (CATION) is defined as above and (ANION) is an anion comprising at least one nitrile functionality.

The liquid electrolyte formulation of the invention allows to obtain a battery having an electrochemical window of at least 5V vs. Li$^+$/Li.

The present invention relates also to a process for preparing a liquid electrolyte formulation as defined above, comprising the steps of:
 a) dissolving the conductive lithium salt in the first ionic liquid to obtain a mixture
 b) heating the mixture of step a) at a temperature comprised between 50° C. and 130° C.
 c) optionally adding the stabilizer
 d) adding to the mixture of step b) or step c) the second ionic liquid while maintaining a temperature comprised between 50° C. and 130° C.
 e) stirring the mixture of step d) while maintaining a temperature comprised between 50° C. and 130° C. until the mixture is completely free of suspended matter
 f) cooling the mixture of step e) to room temperature (25° C.).

The present invention relates also to a lithium metal secondary battery comprising a liquid electrolyte formulation as defined above.

Advantageous embodiments of the invention are defined in the dependent claims and explained in the description.

BRIEF DESCRIPTION OF THE DRAWINGS

The invention will be better understood and objects other than those set forth above will become apparent when consideration is given to the following detailed description thereof. This description makes reference to the annexed drawings, wherein.

DETAILED DESCRIPTION OF THE INVENTION

Figure 1:
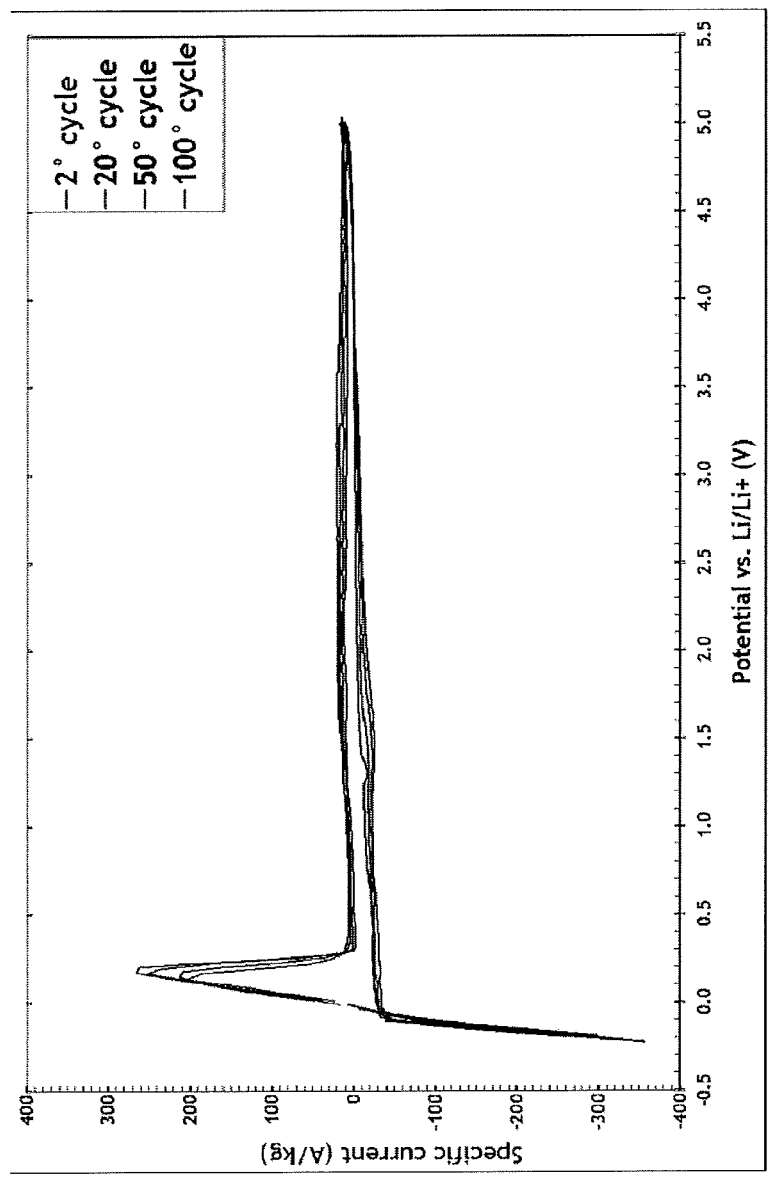
FIG. 1: Cyclovoltammetry with 10 mV/s on stainless steel vs. metallic lithium performed in stainless steel 2025 coin cell of Example 1

As indicated above, the present invention relates to a liquid electrolyte formulation for a lithium metal secondary battery comprising:
- a conductive lithium salt which is selected from the group comprising lithium bis(fluorosulfonyl)imide (LiFSI), LiTFSI, LiCl, LiF, LiCN, LiC$_2$N$_3$, LiN$_3$, LiNO$_2$, LiNO$_3$, LiBF$_4$, LiPF$_6$, LiAsF$_6$, LiSbF$_6$, LiAlCl$_4$.
- a first ionic liquid having the formula (CATION)FSI, wherein FSI is the anion bis(fluorosulfonyl)imide and CATION is selected from the group comprising alkyl pyrollidinium (PYR) and alkyl piperidinium (PIP),
- a second ionic liquid having the formula (CATION)(ANION) where (CATION) is defined as above and (ANION) is an anion comprising at least one nitrile (i.e. at least one nitrile functional groups (N≡), and preferably at least two nitrile.

As know from one skilled in the art, ionic liquids are liquid salts having a melting point below 100° C.

The first ionic liquid is used as solvent of the conductive lithium salt and the second ionic liquid is used as anti-corrosion agent.

Preferably, the alkyl groups carried by the alkyl pyrollidinium and the alkyl piperidinium may be identical or different, and are selected from the group comprising methyl, ethyl, propyl, isopropyl, butyl, pentyl, and hexyl.

Therefore the first ionic liquid (CATION)FSI may be PYR$_{14}$FSI, PYR$_{13}$FSI, PIP$_{13}$FSI, PIP$_{14}$FSI.

Preferably (ANION) of the second ionic liquid is selected from the group comprising dicyanamide (DCA), tricyanomethanide (TCM), Tetracyanoborate (TCB), 4,5-dicyano-1,2,3-triazolide (DCTA), and 3,5-dicyano-1,2,4-triazolide (DCTR).

Therefore the second ionic liquid (CATION)(ANION) may be PYR$_{14}$DCA, PYR$_{14}$TCM, PYR$_{14}$TCB, PYR$_{14}$DCTA, PYR$_{14}$DCTR, PYR$_{13}$DCA, PYR$_{13}$TCB, PYR$_{13}$DCTA, PYR$_{13}$DCTR, PIP$_{13}$DCA, PIP$_{13}$TCB, PIP$_{13}$DCTA, PIP$_{13}$DCTR, PIP$_{14}$DCA, PIP$_{14}$TCB, PIP$_{14}$DCTA, PIP$_{14}$DCTR.

Preferably, the pair (CATION)FSI/(CATION)(ANION) is:
Pyr$_{14}$FSI/Pyr$_{14}$DCA
Pyr$_{13}$FSI/Pyr$_{14}$DCA
Pyr$_{13}$FSI/Pyr$_{13}$DCA
Pyr$_{14}$FSI/Pyr$_{14}$DCA Advantageously, the liquid electrolyte formulation may further comprise a stabilizer which prevents precipitate formation. Preferably, such stabilizer is selected from the group comprising lithium chloride and water. If the second ionic liquid (CATION)(ANION), used as anti-corrosion agent, is stable in the LiFSI-(CATION)FSI mixture (for example) no stabilizer is needed, which may be the case at very low concentration (100 ppm scale). The amount of stabilizer used will be proportional to the amount of the second ionic liquid (CATION)(ANION).

Advantageously, the amount of conductive lithium salt is comprised between 5% and 40% by weight based on the liquid electrolyte formulation, the amount of second ionic liquid is comprised between 0.01% and 5% by weight based on the liquid electrolyte formulation and the amount of stabilizer is less than 1% and, when used, is comprised between 0.001% and 1% by weight based on the liquid electrolyte formulation.

Advantageously, the liquid electrolyte formulation of the invention may further comprise an aprotic aromatic solvent. Preferably, the aprotic aromatic solvent is selected from the group comprising benzene, toluene, xylene, durene.

The liquid electrolyte formulation of the invention has an ionic conductivity comprised between 0.1 and 50 mS/cm 25° C. (preferably at least 1 mS/cm 25° C.).

The electrolyte formulation of the invention wets polypropylene and polyethylene well. Absorption in the separator typically occurs within seconds.

The present invention relates also to a process for preparing a liquid electrolyte formulation as disclosed above, comprising the steps of:
a) dissolving the conductive lithium salt in the first ionic liquid to obtain a mixture
b) heating the mixture of step a) at a temperature comprised between 50° C. and 130° C.
c) optionally adding the stabilizer
d) adding to the mixture of step b) or step c) the second ionic liquid while maintaining a temperature comprised between 50° C. and 130° C.
e) stirring the mixture of step d) while maintaining a temperature comprised between 50° C. and 130° C. until the mixture is completely free of suspended matter
f) cooling the mixture of step e) at room temperature (25° C.).

All preparative steps are performed in an argon-filled glove box.

The present invention relates also to a lithium metal secondary battery comprising a liquid electrolyte formulation as disclosed above.

In such secondary battery, the material of the negative electrode is a metal such as lithium, sodium, magnesium, aluminium, zinc.

The material of the positive electrode may be selected from the group comprising lithium transition metal oxide (such as LiMO$_2$ where M=Co, Ni, Mn, Al or a mixture), lithium transition metal phosphate (such as LiMPO$_4$ where M=Fe, Ni, Co, V), and Li$_x$H$_y$V$_3$O$_8$ as disclosed in EP 2 698 854.

Such secondary batteries are well known from one skilled in the art and need here no further details.

The liquid electrolyte formulation of the invention allows to provide a lithium metal secondary battery in which the electrolyte decomposes without producing gases. The decomposition of FSI at low potential has been shown not to produce any gas. Other passivation or side reaction do not cause observable gasing of the cells in pouch format.

The liquid electrolyte formulation of the invention allows to provide a lithium metal secondary battery with wide electrochemical stability window. The electrolyte formulation of the invention allows for operation between −0.5 V vs. Li$^+$/Li with copper and steel current collectors and up to 5 Volts with steel or aluminum current collectors.

The liquid electrolyte formulation of the invention allows to provide a lithium metal secondary battery that allows for lithium metal cycling efficiency over 98%. Upon cycling the coulombic efficiency (CE) should become higher and higher as a trend in order to preserve the cell components.

The following examples illustrate the present invention without thereby limiting its scope.
Electrolyte Formulation The following formulation was used in the examples below:
Pyr$_{14}$FSI as first ionic liquid
ratio LiFSI:Pyr$_{14}$FSI 1:3 by weight
1 w-% Pyr$_{14}$DCA as second ionic liquid (anti-corrosion agent)
0.01 w-% LiCl as stabilizer.

LiFSI was purchased from CoorsTek Specialty Chemicals, Pyr$_{14}$FSI and Pyr$_{14}$DCA were purchased from Solvionic and anhydrous LiCl was purchased from Sigma-Aldrich Inc.

LiFSI was dissolved in Pyr$_{14}$FSI. The solution was heated to approximately 80° C. and LiCl was added. The mixture was kept at a temperature of 80° C. and Pyr$_{14}$DCA was added. The solution was stirred and kept warm until completely free of suspended matter, then allowed to cool to room temperature. All preparative steps were performed in an argon-filled glove box.

EXAMPLE 1

A 2025 button cell was assembled in order to determine if lithium deposition-dissolution occurs and to verify that no apparent corrosion is visible. To do so, a negative electrode made of 1 cm$^2$ lithium foil (0.1 mm thickness), a Celgard 2400 separator and stainless steel disk as the positive electrode were stacked in the 2025 housing. Additional stainless steel disks were used as spacer if needed. Cyclovoltametry was then performed at 10 mV/s between −3 mA to 5V for 100 cycles as shown by FIG. 1 (FIG. 1 shows cycles 2, 20, 50 and 100). The pattern of lithium deposition and dissolution is clear and stable while no other electrochemical process is visible. The electrochemical window of such a system is therefore at least 5V vs. Li+/Li.

EXAMPLE 2

Figure 2:
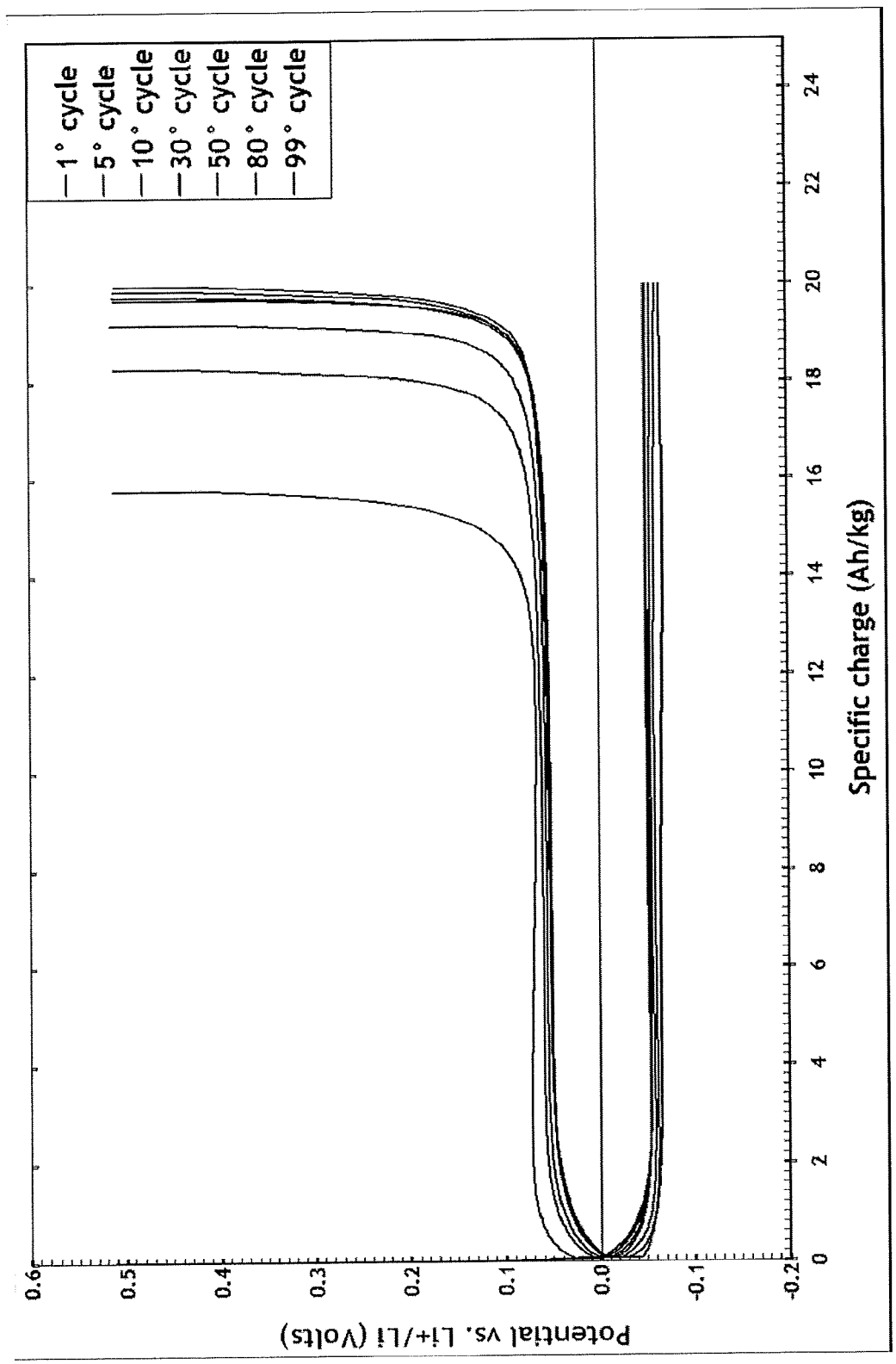
FIG. 2: Galvanostatic lithium deposition-dissolution with 0.5 mA/cm$^2$ and 0.1 mAh/cm$^2$ on stainless steel performed in stainless steel 2025 coin cell of Example 2
Figure 3:
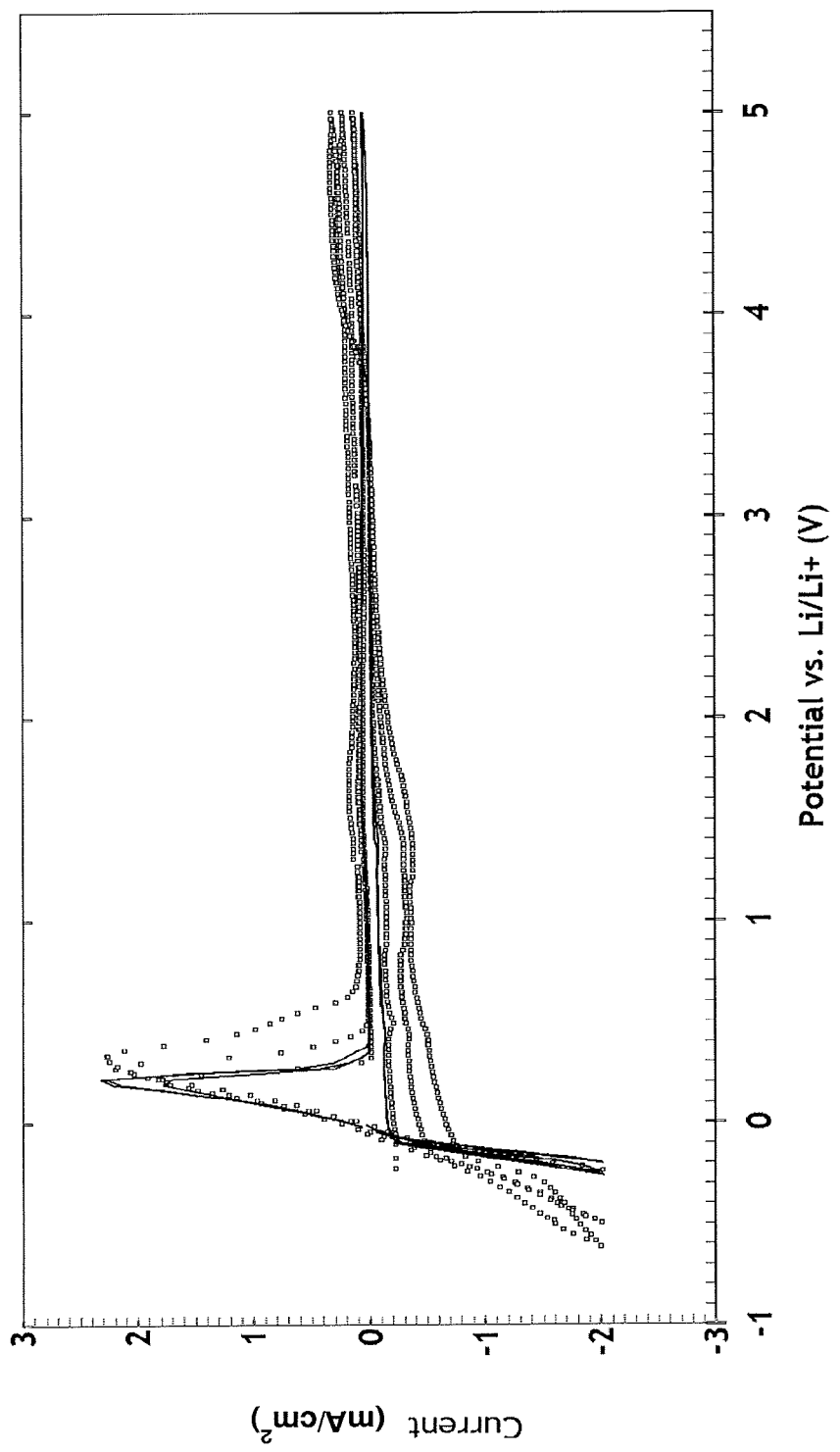
FIG. 3: Cyclovoltametry with 10 mV/s on stainless steel vs. metallic lithium with (continuous) and without (dashed) anti-corrosion agent. The figure shows cycles 2, 20, 50 and 100. The measurement was performed in stainless steel 2025 coin cell.

The same procedure using same components as Example 1 with the exception of the electrolyte was used. The electrolyte did not contain any second ionic liquid (CATION)(ANION) as anti-corrosion agent nor stabilizer. The corrosion of the stainless steel is apparent from the first cycle and increases over time (FIG. 2). FIG. 2 shows cycles 1, 5, 10, 30, 50, 80 and 99. The coulombic efficiency reaches 75% in the first cycle and increases upon cycling to reach over 99% at the 99th cycle.

EXAMPLE 3

Figure 4:
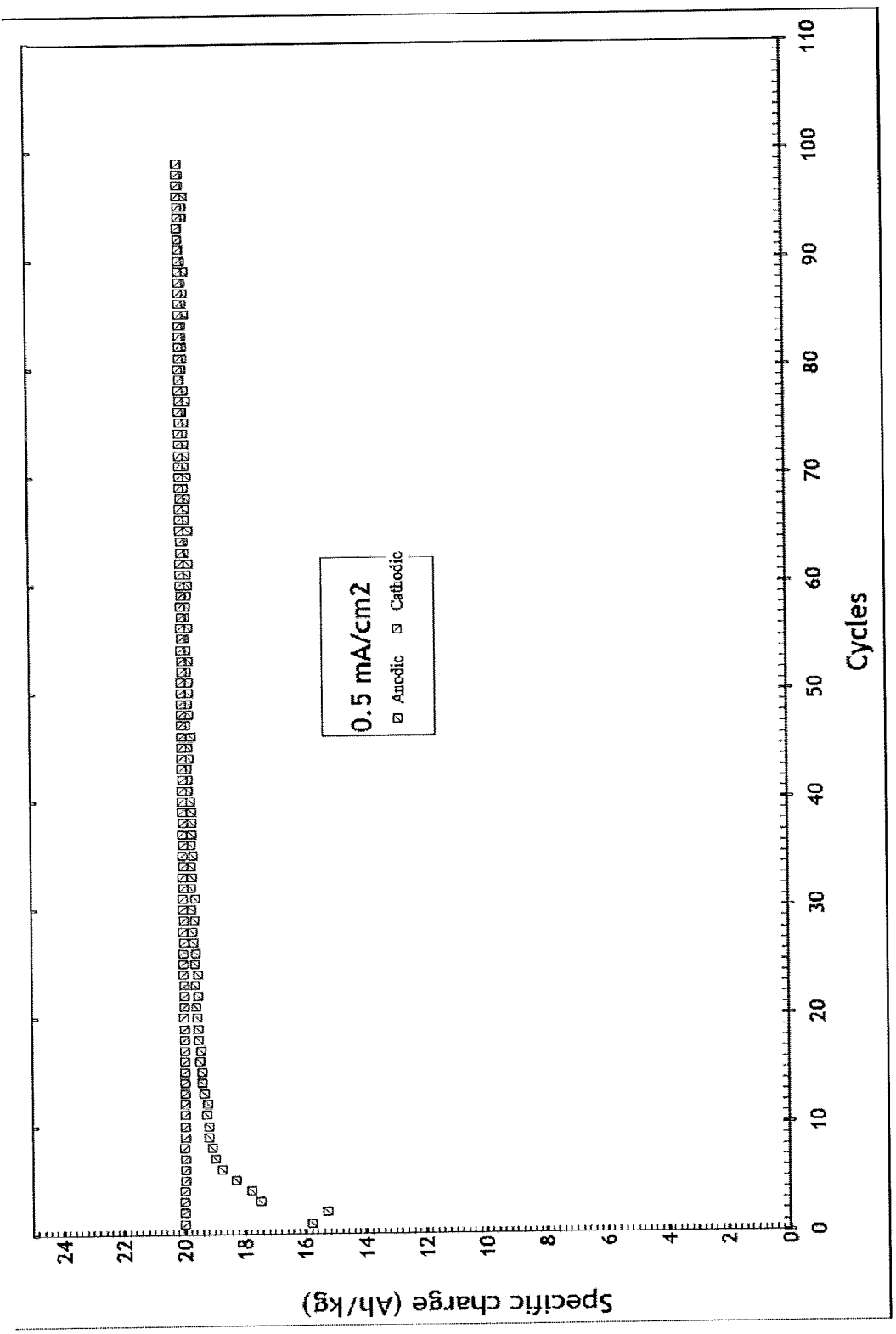
FIG. 4: Cathodic and anodic capacities measured over 100 cycles in a 2025 coin cell.

The same construction and components as in Example 1 were used. Lithium deposition was performed with 0.5 mA up to 0.1 mAh and lithium dissolution was performed with 0.5 mA to 500 mV. This setup aims at the determination of the coulombic efficiency (CE) at a given current rate. While CE reaches only about 75% in the first cycle, its value improves quickly over subsequent cycles and lays over 99% after 20 cycles (FIG. 4).

EXAMPLE 4

Figure 5:
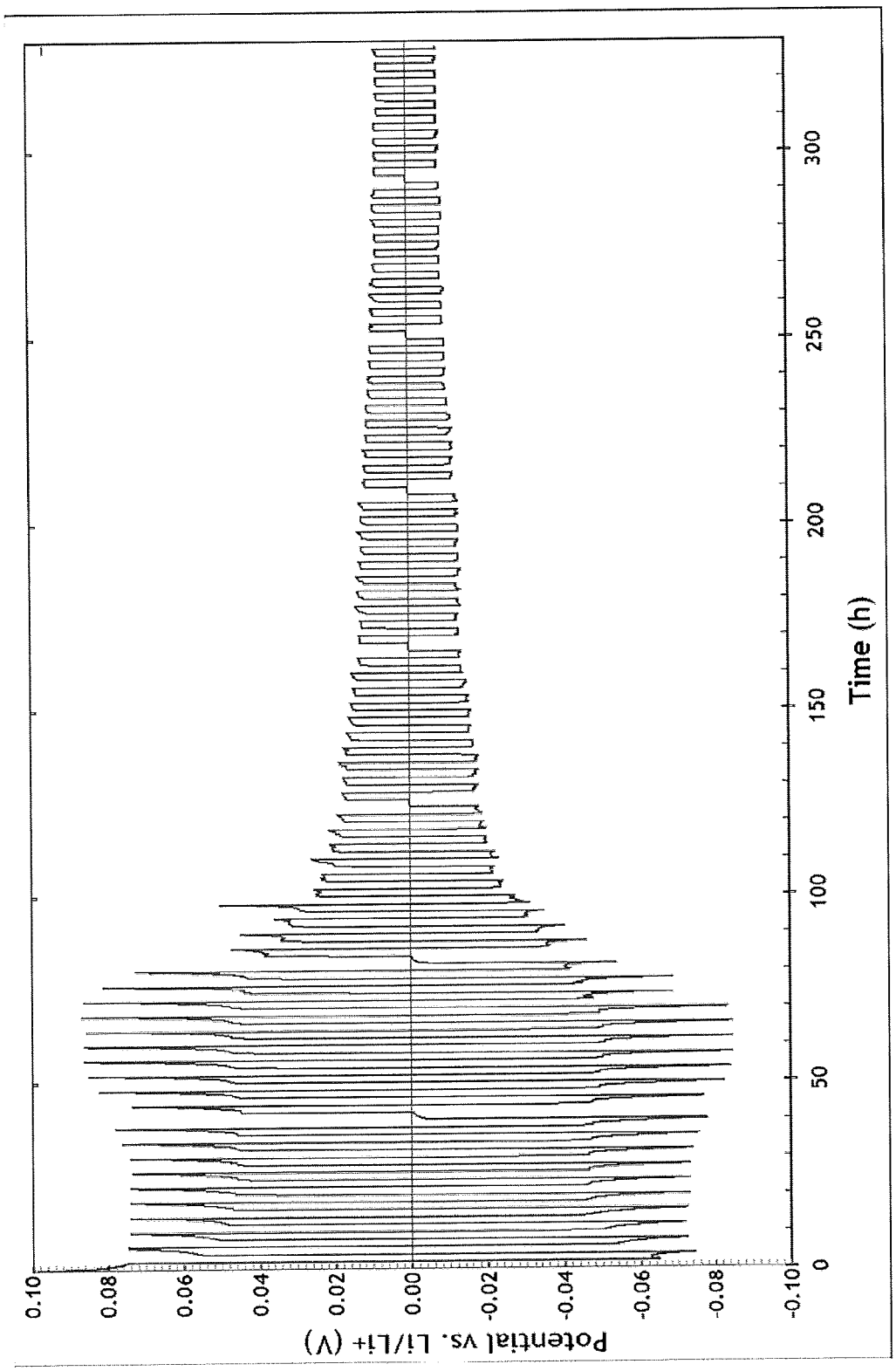
FIG. 5: Potential vs Li/Li+ as a function of time performed in stainless steel 2025 coin cell of Example 4 with current pulses of 1.25 mA/cm$^2$ for 2 hours depositing 2.5 mAh/cm$^2$

A symmetric lithium-lithium cell was build using the 2025 bottom cell construction from Example 1 with two lithium electrodes. A current of 1.25 mA/cm$^2$ was applied for 2 hours in the first half cycle. In the second half cycle a current of −1.25 mA/cm$^2$ was applied for two hours. In this way, 2.5 mAh/cm$^2$ of lithium are deposited and dissolved on each electrode. Every ten cycles the measurement is halted and resumes cycling after two hours (FIG. 5). This procedure aims at qualifying the SEI and the nature of the deposited lithium. Rising impedance is usually observed when the electrolyte formulation is unsuitable. In most cases, this eventually leads to cell short circuit. In the present example, the deposition overvoltage decreases upon cycling, which corresponds to a stabilization of the deposition-dissolution process. It is important to notice that the overvoltage does not increase significantly after the 2 hours brake, which hints at a stable SEI that prevents continuous degradation of the bulk lithium.

EXAMPLE 5

Figure 6:
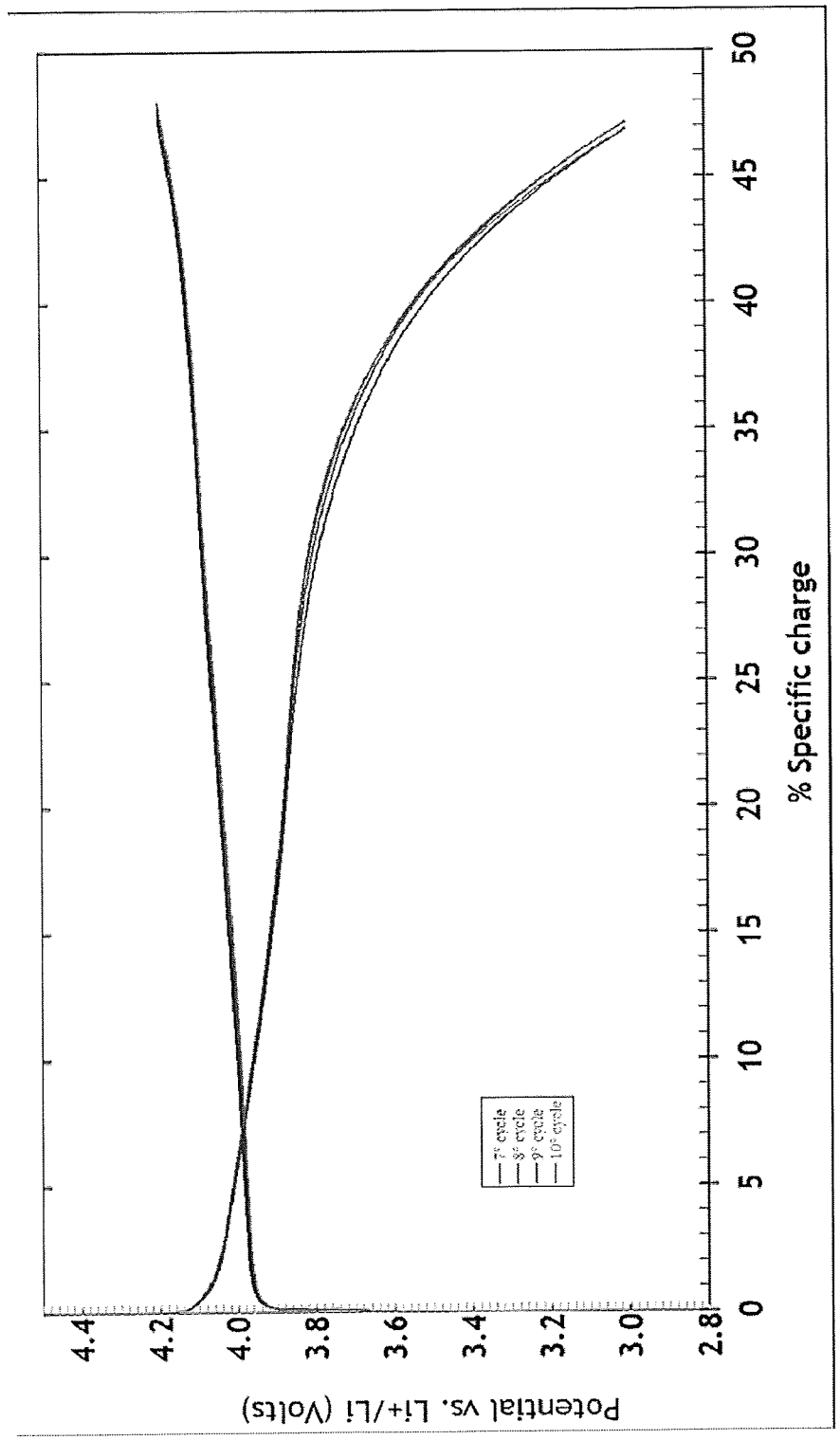
FIG. 6: Galvanostatic cycling of LiCoO$_2$ with 0.5 mA/cm$^2$ performed in stainless steel 2025 coin cell of Example 5

A secondary lithium metal cell was built using the same construction as in Example 1 with LiCoO$_2$ coated on Aluminum (6 to 8 mg/cm$^2$) as the positive electrode and lithium foil as the negative electrode. FIG. 6 shows the galvanostatic cycling of LiCoO$_2$ with 0.5 mA/cm$^2$ (active material load is 1 mg/cm$^2$ coated on bare aluminum foil). FIG. 6 shows cycles 7, 8, 9 and 10. No capacity loss nor increase in overvoltage can be detected in the selected cycling range.

EXAMPLE 6

Figure 7:
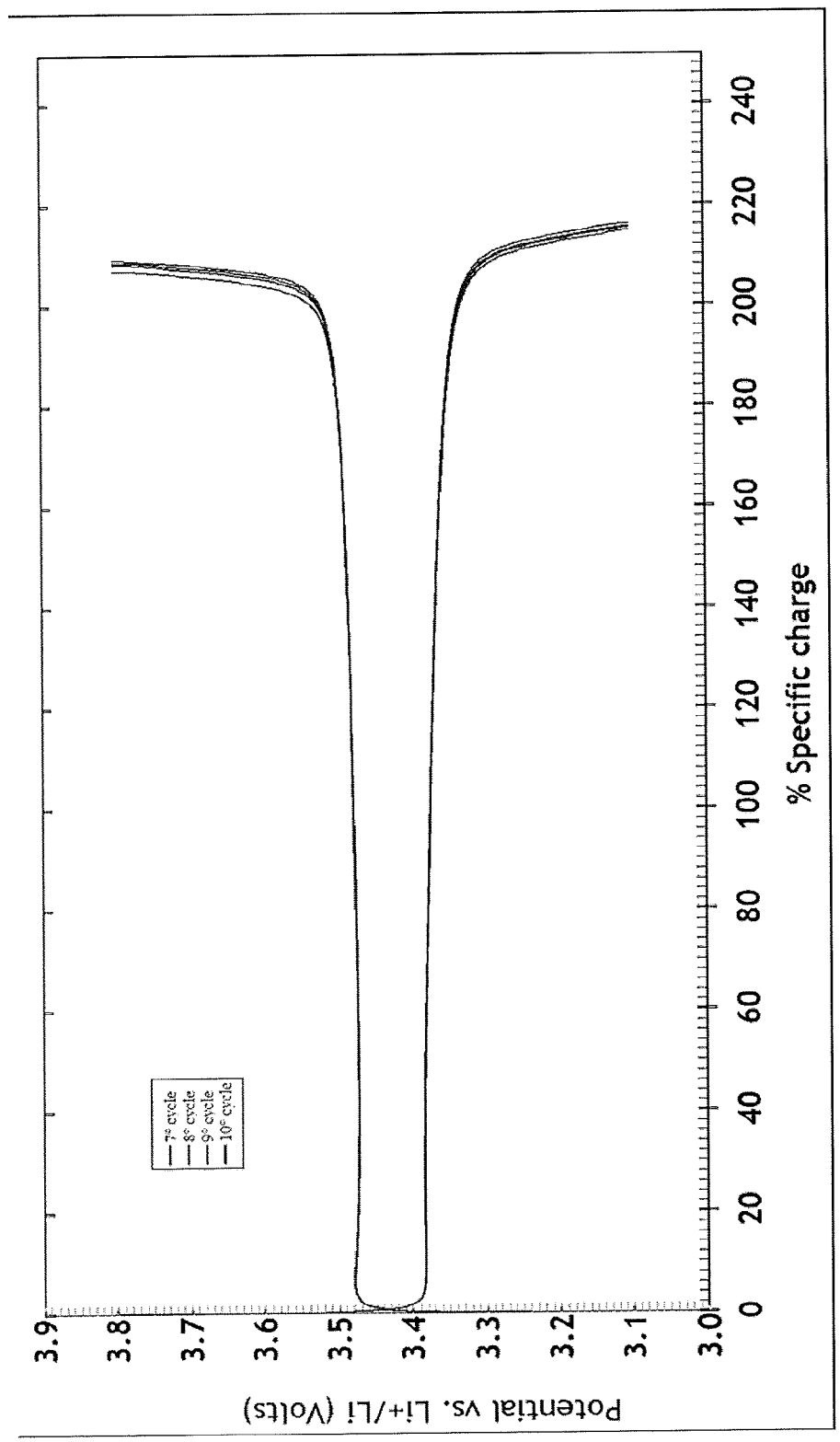
FIG. 7: Galvanostatic cycling of LiFePO$_4$ with 0.2 mA/cm$^2$ performed in stainless steel 2025 coin cell of Example 6

A secondary lithium metal cell was built using the same construction as in Example 1 with LFP coated on Aluminum (12 to 15 mg/cm$^2$) as the positive electrode and lithium foil as the negative electrode. FIG. 7 shows the galvanostatic cycling of LiFePO$_4$ with 0.2 mA/cm$^2$ (active material load is 13 mg/cm$^2$ coated on bare aluminum foil). FIG. 7 shows cycles 7, 8, 9 and 10. No capacity loss nor increase in overvoltage can be detected in the selected cycling range.

EXAMPLE 7

Figure 8:
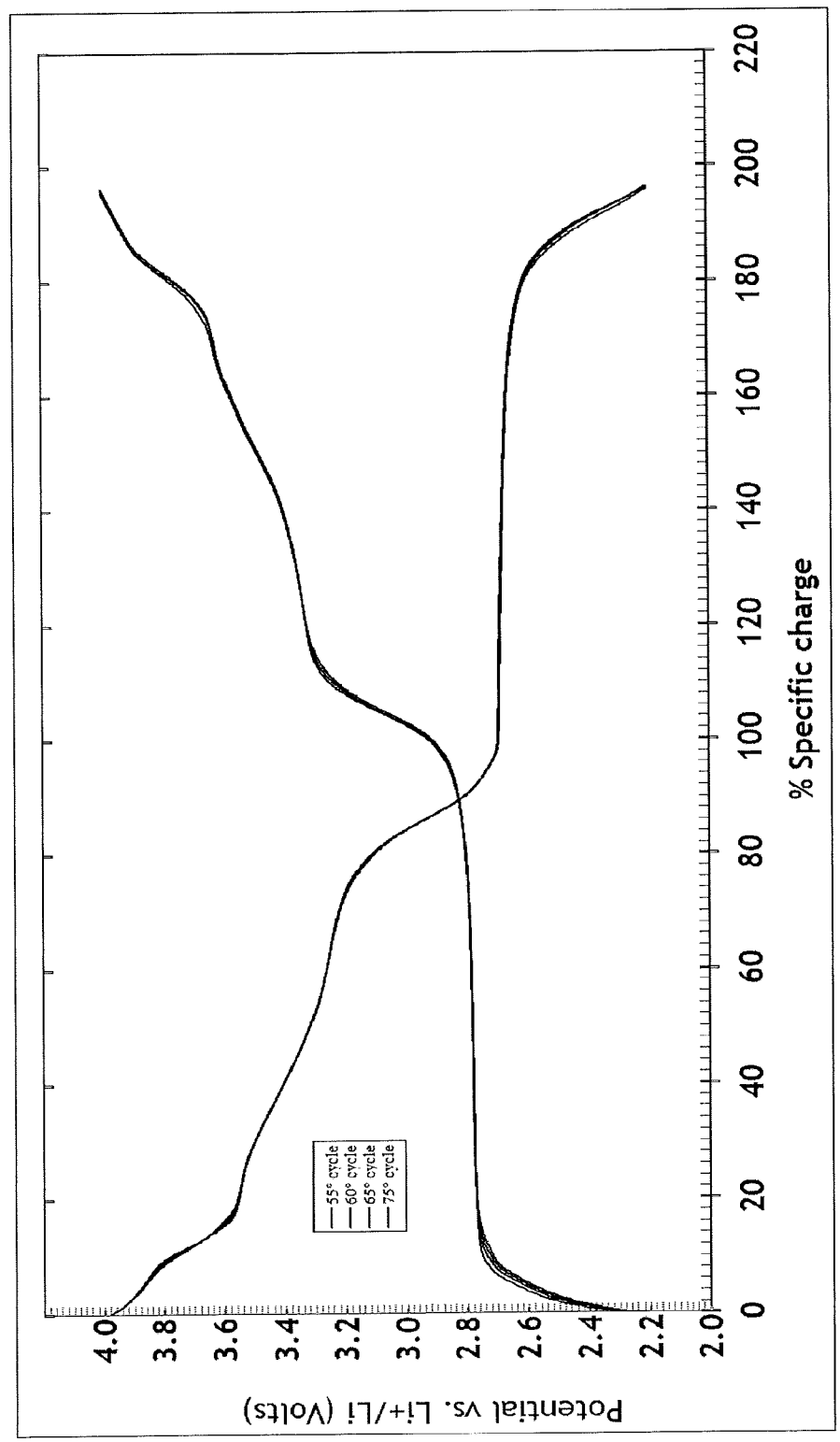
FIG. 8: Galvanostatic cycling of Li$_x$H$_y$V$_3$O$_8$ with 0.5 mA/cm$^2$ performed in stainless steel 2025 coin cell of Example 7

A secondary lithium metal cell was built using the same construction as in Example 1 with Li$_x$H$_y$V$_3$O$_8$ coated on Aluminum (10-12 mg/cm$^2$) as the positive electrode and lithium foil as the negative electrode. FIG. 8 shows the galvanostatic cycling of Li$_x$H$_y$V$_3$O$_8$ with 0.5 mA/cm$^2$ (active material load is 10 mg/cm$^2$ coated on carbon coated aluminum foil). FIG. 8 shows cycles 55, 60, 65 and 75. No capacity loss nor increase in overvoltage can be detected in the selected cycling range.

EXAMPLE 8

Figure 9:
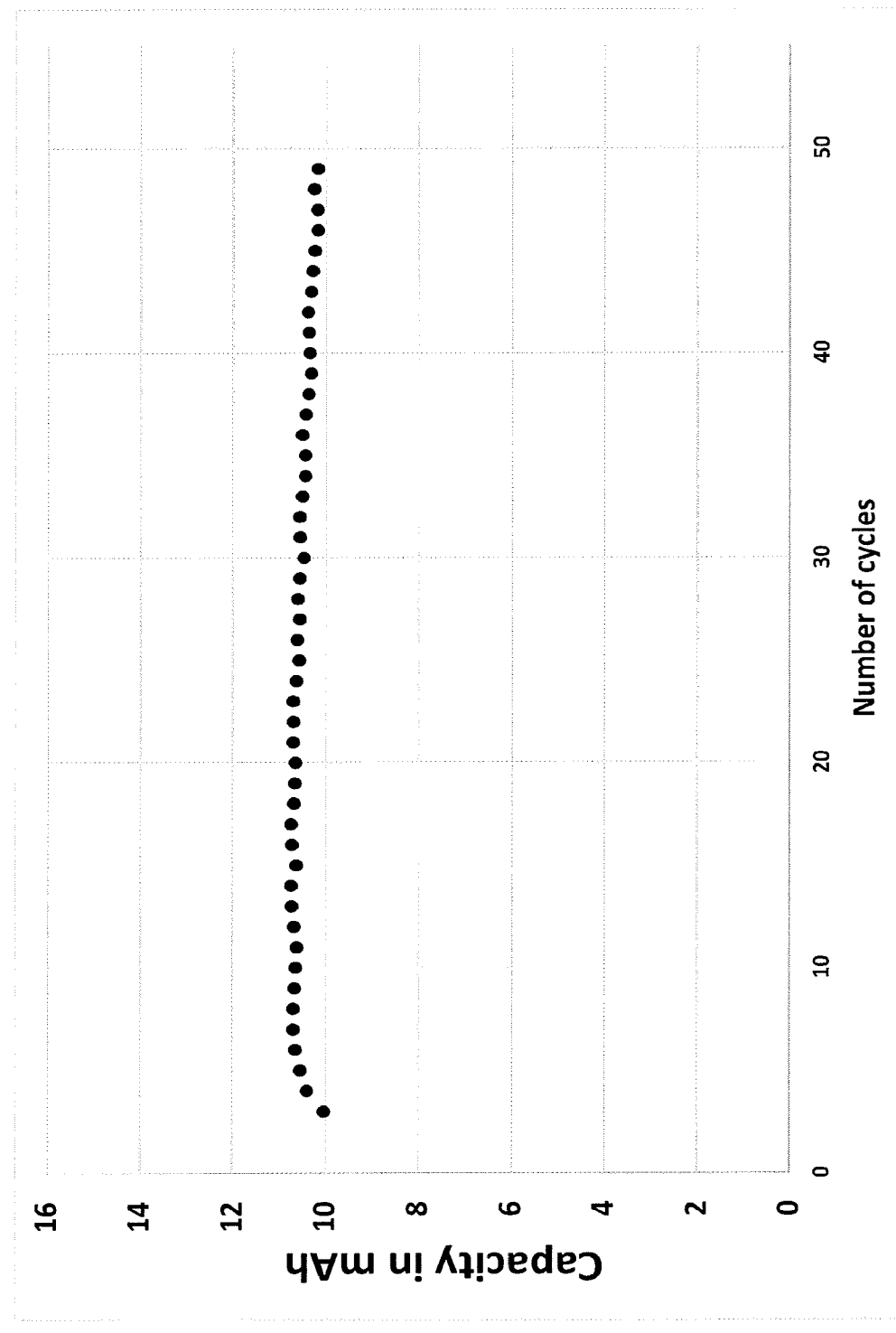
FIG. 9: Charge-discharge curve of LFP-lithium secondary cell in pouch format with 0.4 mA/cm$^2$ of Example 8

A secondary prismatic lithium metal cell was built using a pouch foil and stainless steel current collectors. The negative electrode consists of 50 μm lithium foil and the positive electrode of LFP (coating on steel 12-15 mg/cm$^2$). 8 μl/cm$^2$ of electrolyte were introduced on the cathode surface before vacuum sealing. Teijin MFS FZA1101 was used as the separator. Electrochemical measurements were performed at 0.4 mA/cm$^2$ between 2V and 3.8V. No external pressure was applied to the cell. FIG. 9 shows the charge-discharge curve for the first 50 cycles.

What is claimed is:

1. A liquid electrolyte formulation for a lithium metal secondary battery comprising:
    a conductive lithium salt which is selected from the group consisting of LiTFSI, LiFSI, LiCl, LiF, LiCN, LiC$_2$N$_3$, LiN$_3$, LiNO$_2$, LiNO$_3$, LiBF$_4$, LiPF$_6$, LiAsF$_6$, LiSbF$_6$, and LiAlCl$_4$,
    a first ionic liquid having the formula (CATION)FSI, wherein CATION is selected from the group consisting of alkyl pyrollidinium and alkyl piperidinium,
    a second ionic liquid as anti-corrosion agent, said second ionic liquid having the formula (CATION)(ANION) where (CATION) is defined as above and (ANION) is an anion comprising at least one nitrile functionality.

2. The liquid electrolyte formulation according to claim 1, further comprises a stabilizer which prevents precipitate formation.

3. The liquid electrolyte formulation according to claim 2, wherein the stabilizer is selected from the group consisting of lithium chloride and water.

4. The liquid electrolyte formulation according to claim 2, wherein the amount of stabilizer is comprised between 0.001% and 1% by weight based on the liquid electrolyte formulation.

5. The liquid electrolyte formulation according to claim 1, wherein the amount of conductive lithium salt is comprised between 5% and 40% by weight based on the liquid electrolyte formulation.

6. The liquid electrolyte formulation according to claim 1, wherein the amount of second ionic liquid is comprised between 0.01% and 5% by weight based on the liquid electrolyte formulation.

7. The liquid electrolyte formulation according to claim 1, wherein the first ionic liquid (CATION)FSI is selected from the group consisting of PYR$_{14}$FSI, PYR$_{13}$FSI, PIP$_{13}$FSI, and PIP$_{14}$FSI.

8. The liquid electrolyte formulation according to claim 1, wherein (ANION) is selected from the group consisting of dicyanamide (DCA), tricyanomethanide (TCM), Tetracyanoborate (TCB), 4,5-dicyano-1,2,3-triazolide (DCTA), and 3,5-dicyano-1,2,4-triazolide (DCTR).

9. The liquid electrolyte formulation according to claim 1, further comprises an aprotic aromatic solvent.

10. The liquid electrolyte formulation according to claim 9, wherein the aprotic aromatic solvent is selected from the group consisting of benzene, toluene, xylene, and durene.

11. A process for preparing a liquid electrolyte formulation for a lithium metal secondary battery comprising:
    a conductive lithium salt which is selected from the group consisting of LiTFSI, LiFSI, LiCl, LiF, LiCN, LiC$_2$N$_3$, LiN$_3$, LiNO$_2$, LiNO$_3$, LiBF$_4$, LiPF$_6$, LiAsF$_6$, LiSbF$_6$, and LiAlCl$_4$,
    a first ionic liquid having the formula (CATION)FSI, wherein CATION is selected from the group consisting of alkyl pyrollidinium and alkyl piperidinium,
    a second ionic liquid as anti-corrosion agent, said second ionic liquid having the formula (CATION)(ANION) where (CATION) is defined as above and (ANION) is an anion comprising at least one nitrile functionality,
    wherein said process comprises the steps of:
    a) dissolving the conductive lithium salt in the first ionic liquid to obtain a mixture
    b) heating the mixture of step a) at a temperature comprised between 50° C. and 130° C.
    c) optionally adding a stabilizer to the mixture
    d) adding to the mixture of step b) or step c) the second ionic liquid while maintaining a temperature comprised between 50° C. and 130° C.
    e) stirring the mixture of step d) while maintaining a temperature comprised between 50° C. and 130° C. until the mixture is completely free of suspended matter
    f) cooling the mixture of step e) to room temperature.

12. A lithium metal secondary battery comprising a liquid electrolyte formulation for a lithium metal secondary battery comprising:
    a conductive lithium salt which is selected from the group consisting of LiTFSI, LiFSI, LiCl, LiF, LiCN, LiC$_2$N$_3$, LiN$_3$, LiNO$_2$, LiNO$_3$, LiBF$_4$, LiPF$_6$, LiAsF$_6$, LiSbF$_6$, and LiAlCl$_4$,
    a first ionic liquid having the formula (CATION)FSI, wherein CATION is selected from the group consisting of alkyl pyrollidinium and alkyl piperidinium,
    a second ionic liquid as anti-corrosion agent, said second ionic liquid having the formula (CATION)(ANION) where (CATION) is defined as above and (ANION) is an anion comprising at least one nitrile functionality.

* * * * *